(12) United States Patent
Stawitzky et al.

(10) Patent No.: US 11,444,886 B1
(45) Date of Patent: Sep. 13, 2022

(54) OUT OF ORDER PACKET BUFFER SELECTION

(71) Applicant: Marvell Asia Pte Ltd, Singapore (SG)

(72) Inventors: Noa Stawitzky, Tel Aviv (IL); Yoav Galon, Givatayim (IL); Amit Radzi, Tel Aviv (IL); Shaham Kenat, Hod Hasharon (IL); Michael Shteinbok, Netanya (IL)

(73) Assignee: Marvell Asia Pte Ltd, Singapore (SG)

( * ) Notice: Subject to any disclaimer, the term of this patent is extended or adjusted under 35 U.S.C. 154(b) by 256 days.

(21) Appl. No.: 16/577,625

(22) Filed: Sep. 20, 2019

Related U.S. Application Data (60) Provisional application No. 62/734,894, filed on Sep. 21, 2018.

(51) Int. Cl.
| | |
|---|---|
| *H04L 47/34* | (2022.01) |
| *H04L 47/32* | (2022.01) |
| *G06F 13/28* | (2006.01) |
| *H04L 47/30* | (2022.01) |
| *H04L 47/193* | (2022.01) |

(52) U.S. Cl.
CPC ............ *H04L 47/34* (2013.01); *G06F 13/28* (2013.01); *H04L 47/193* (2013.01); *H04L 47/30* (2013.01); *H04L 47/32* (2013.01)

(58) Field of Classification Search
CPC ....... H04L 47/34; H04L 47/193; H04L 47/30; H04L 47/32; G06F 13/28
See application file for complete search history.

(56) References Cited

U.S. PATENT DOCUMENTS

| | | | | |
|---|---|---|---|---|
| 2004/0133713 | A1* | 7/2004 | Elzur | ............... H04L 47/193 |
| | | | | 710/52 |
| 2007/0162723 | A1* | 7/2007 | Ali | ................. G06F 9/3861 |
| | | | | 712/205 |
| 2009/0225771 | A1* | 9/2009 | Yasuda | ............. H04L 69/162 |
| | | | | 370/412 |
| 2009/0319634 | A1* | 12/2009 | Tanaka | ................. H04L 47/24 |
| | | | | 709/212 |

(Continued)

OTHER PUBLICATIONS

U.S. Appl. No. 16/577,545, Malin et al., "Out Of Order Placement of Data in Network Devices," filed Sep. 20, 2019. Specification.

(Continued)

*Primary Examiner* — Jeffrey M Rutkowski
*Assistant Examiner* — Jasper Kwoh (57) ABSTRACT

A method for storing a packet in an application buffer of a processor node is described. A first out of order (OOO) packet within a stream of packets transmitted from a second network interface controller is received in a sequence represented by respective sequence numbers that are assigned to corresponding packets in the stream. The first OOO packet is received out of order relative to at least a first missing packet of the stream of packets. One of an OOO buffer associated with the first network interface controller or the application buffer associated with the first network interface controller is selected. The OOO buffer is configured to store OOO packets. The first network interface controller is configured to store the stream of packets in sequential order in the application buffer. The first OOO packet is stored in the selected buffer.

29 Claims, 7 Drawing Sheets

(56) References Cited

U.S. PATENT DOCUMENTS

| | | | |
|---|---|---|---|
| 2014/0269294 A1* | 9/2014 | Morandin | H04L 47/826 370/234 |
| 2016/0019060 A1* | 1/2016 | Chatha | G06F 9/3836 712/241 |
| 2017/0325124 A1* | 11/2017 | Mitra | H04L 47/34 |
| 2019/0013965 A1* | 1/2019 | Sindhu | G06F 13/4282 |
| 2020/0042475 A1* | 2/2020 | Venkataramani | G06F 3/0665 |

OTHER PUBLICATIONS

U.S. Appl. No. 16/577,630, Malin et al., "Negotiation of Alignment Mode for Out of Order Placement of Data in Network Devices," filed Sep. 20, 2019, Specification.

\* cited by examiner

OUT OF ORDER PACKET BUFFER SELECTION

CROSS-REFERENCES TO RELATED APPLICATIONS

This disclosure claims the benefit of U.S. Provisional Patent Application No. 62/734,894, entitled "Out of Order (OOP) Placement in a Network device" and filed on Sep. 21, 2018, the disclosure of which is incorporated herein by reference in its entirety.

FIELD OF THE DISCLOSURE

The present disclosure relates generally to communication networks and, more particularly, to storing out of order packets.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Remote direct memory access protocol (RDMA or RDMAP) is a protocol that provides direct memory access from the memory of one processor node into the memory of another processor node with reduced involvement of the operating system of either processor node. This provides higher transfer throughput and lower latency than some memory access techniques that utilize the operating system. The RDMA or RDMAP protocol is particularly useful in massively parallel computer clusters. In some scenarios, for example, environments with packet loss or complex network paths, RDMA packets may be lost or delayed, which can result in the receipt of packets out of order (OOO packets) by the receiving processor node, for example due to retransmission. When packets must be processed according to a particular sequence, the receipt of OOO packets present challenges at the receiving processor node, for example, where to store the OOO packets while waiting for a missing packet that follows the sequence and how to organize the OOO packets when they belong to different data streams from different processor nodes.

SUMMARY

In an embodiment, a method for storing a packet in an application buffer of a processor node includes: receiving, at a first network interface controller of the processor node, a first out of order (OOO) packet within a stream of packets transmitted from a second network interface controller in a sequence represented by respective sequence numbers that are assigned to corresponding packets in the stream, the first OOO packet being received out of order relative to at least a first missing packet of the stream of packets; selecting, at the first network interface controller, one of an OOO buffer associated with the first network interface controller or the application buffer associated with the first network interface controller, wherein the OOO buffer is configured to store OOO packets, wherein the first network interface controller is configured to store the stream of packets in sequential order in the application buffer; and storing, by the first network interface controller, the first OOO packet in the selected buffer.

In another embodiment, a network interface controller for storing a packet in an application buffer of a first processor node includes a processor. The processor is configured to access i) the application buffer of the processor node, ii) an OOP information buffer associated with a stream of packets, and iii) an out of order (OOO) buffer configured to store OOO packets. The application buffer is configured to store the stream of packets in sequential order. The processor has i) a buffer selector configured to select one of the OOO buffer or the application buffer and ii) one or more integrated circuits configured to: receive a first OOO packet within the stream of packets, the stream of packets being transmitted from a second processor node in a sequence represented by respective sequence numbers that are assigned to corresponding packets in the stream, the first OOO packet being received out of order relative to at least a first missing packet of the stream of packets; and store the first OOO packet in the selected buffer that is selected by the buffer selector.

DETAILED DESCRIPTION

Copy operations of data from an application memory to a processor to a network interface controller when a memory access is performed over an Internet connection (e.g., using transmission control protocol/Internet protocol), add latency and consume significant processor and memory resources at both the source processor node that transmits the data and target processor node that receives the data. The Remote Direct Memory Access Protocol (RDMAP) provides direct memory access from the application memory of one processor node into that of another processor node with reduced involvement of the processor and operating system of either processor node when the memory access is performed over an Internet connection. In some scenarios, RDMA packets are received out of order due to congestion or retransmission. In some embodiments, the out of order (OOO) packets are dropped. In other embodiments, OOO packets are saved in a dedicated OOO buffer until the missing packets arrive. In still other embodiments, OOO packets are handled upon their arrival using out of order placement (OOP) techniques (e.g., "placing" the packet in an application buffer, without "delivering" the packet to the target processor node, as described herein). In some embodiments, providing for an OOP technique requires per-connection dedicated resources, for example, a separate OOP information buffer that temporarily stores OOP information for packets that have been placed, but not yet delivered. OOP techniques also have complexity limitations on which packets can be placed, for example, a number of packets that can be placed without being delivered, RDMA operations that can be performed using OOP techniques, etc.

In at least some of the embodiments described herein, the target processor node includes both an OOO buffer and an OOP information buffer and supports both placing OOO packets in the application buffer for later delivery and storing the OOO packets in the OOO buffer for later transfer to the application memory. In various embodiments, the target processor node includes a buffer selector that selects one of the OOO buffer or the application buffer, for example, based on availability of the OOP information buffer. In some embodiments, this hybrid approach utilizing both an OOP information buffer and OOO buffer allows for at least some RDMA operations to be completed without significant involvement of the CPU of either processor node (i.e., a "zero copy operation") and without requiring a large number of OOP information buffers.

Figure 1:
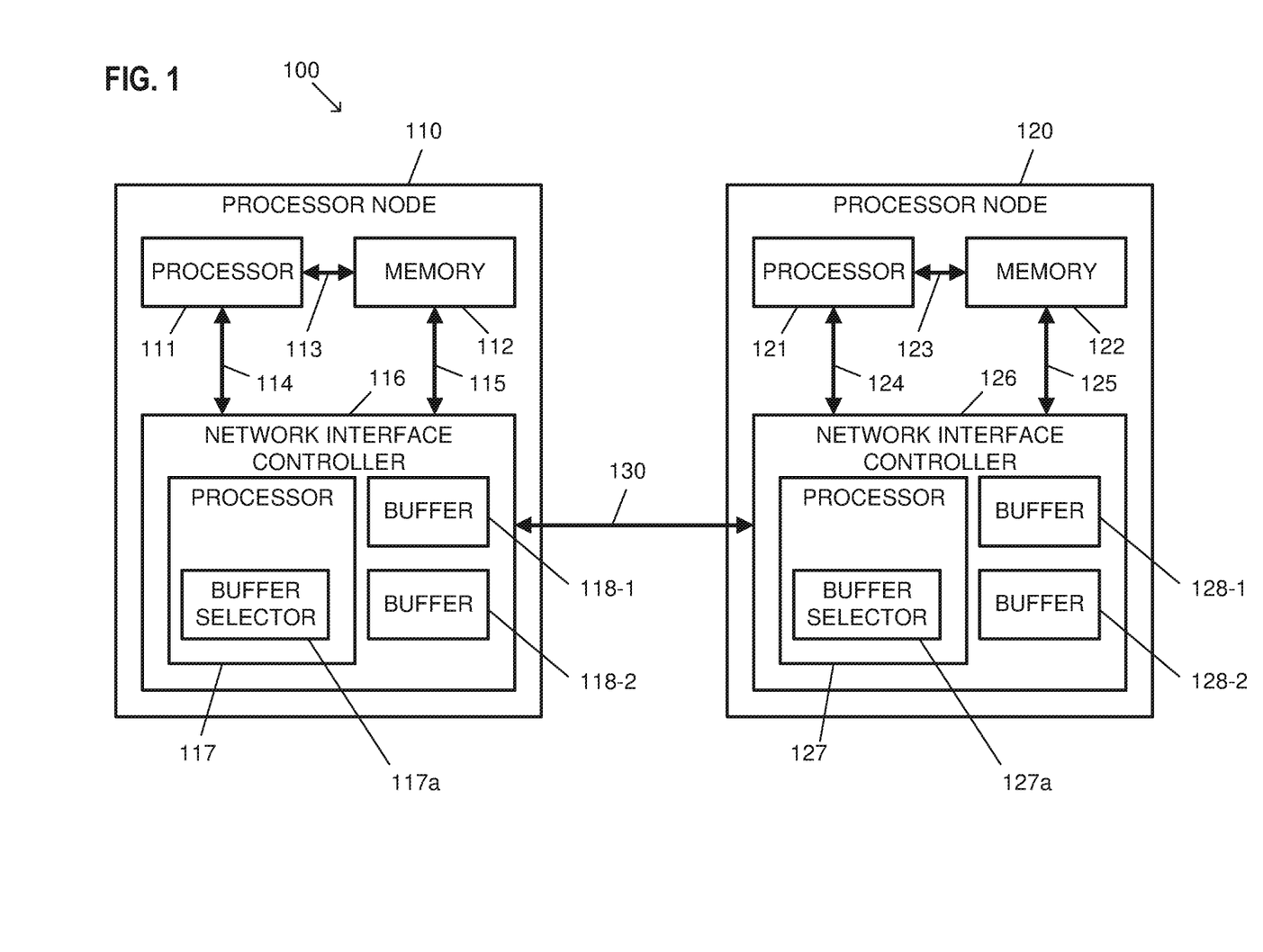
FIG. 1 is a block diagram of an example processor node network having two processor nodes that are communicatively coupled by a communication link, according to an embodiment.

FIG. 1 is a block diagram of an example processor node network 100 having two processor nodes 110 and 120 that are communicatively coupled by a communication link 130, according to an embodiment. In an embodiment, the processor nodes 110 and 120 are computing devices attached to one or more links of a network or communication fabric, for example, nodes of a parallel processing system. In some embodiments, the processor nodes 110 and 120 are individual computers of a distributed computing system. In the embodiment shown in FIG. 1, the processor node 110 includes a processor 111, a memory 112 coupled with the processor 111 via memory bus 113, and a network interface controller 116. The processor nodes 110 and 120 are configured to run an operating system or kernel, for example, Microsoft Windows, Linux, Unix, Compute Node Linux (CNL), Compute Node Kernel (CNK), or other suitable processing environment.

In various embodiments, the processor 111 is a central processing unit (CPU) or microprocessor having one or more cores or processing engines, for example, an Intel Xeon, Core, or Atom microprocessor, an Advanced Micro Devices Ryzen or Epyc microprocessor, a Power Instruction Set Architecture (ISA), or other suitable microprocessor. Although only a single processor 111 is shown in FIG. 1, in other embodiments, the processor node 110 includes two, three, or more processors. In an embodiment, the processor node 110 includes additional processors (not shown) that access the memory 112, such as graphical processing units (GPUs), parallel processors, application specific integrated circuits (ASICs), or other suitable processing devices.

The memory 112 is an application memory for storing application data (e.g., at the application layer of the Open Systems Interconnection model), operating system data, or other suitable data, for example, random access memory (RAM) module or other suitable memory device, in various embodiments. Although only a single memory 112 is shown, the processor node 110 includes two, three, four, or more RAM modules, in other embodiments. The memory bus 113 is a communication interface or "channel" between the processor 111 and the memory 112. Although only a single memory bus 113 is shown, the memory bus 113 is a dual-channel bus, triple-channel bus, quad-channel bus, or other suitable memory interface. In some embodiments, the processor node 110 includes a memory controller (not shown) that manages data transfers between the processor 111 and the memory 112. In an embodiment, the processor 111 includes a memory controller portion that manages data transfers between the processor 111 and the memory 112. In some embodiments, the processor node 110 includes one or more additional data storage devices (not shown), for example, a solid state disk (SSD), hard disk drive (HDD), or other suitable storage device.

The network interface controller 116 includes a processor 117 and one or more buffers 118 (e.g., buffers 118-1 and 118-2). The network interface controller 116 is configured to provide a communication link between the processor node 110 and other processor nodes of the processor node network 100. In an embodiment, the network interface controller 116 is communicatively coupled with the processor 111 via a communication bus 114, for example, a peripheral component interconnect (PCI) bus, a PCI Express (PCI-E) bus, universal serial bus (USB), or other suitable communication bus. In an embodiment, the network interface controller 116 is communicatively coupled with the memory 112 via a direct memory access (DMA) bus 115 or other suitable communication bus. In an embodiment, the processor node 110 includes a DMA processor (not shown) that supports communications over the DMA bus 115. In another embodiment, the network interface controller 116 includes a DMA processor (not shown) that supports the communications over the DMA bus 115. In some embodiments, a communication controller (not shown) manages communications over both the communication bus 114 and the DMA bus 115. In one such embodiment, the network interface controller 116 uses a single bus to communicate with the communication controller, which then communicates with the processor 111 and memory 112 via respective buses.

The processor 117 includes one or more integrated circuits (ICs) configured to operate as discussed below. In an embodiment, the processor 117 includes a buffer selector 117a configured to select one of a plurality of buffers, for example, buffer 118-1, buffer 118-2, and/or memory 112, as described below. In various embodiments, the processor 117 is configured to send and receive data via the communication bus 114, the DMA bus 115, and the communication link 130 using one or more communication protocols. In various embodiments, the processor 117 supports one or more of a remote direct memory access (RDMA) protocol, an internet wide area RDMA protocol (iWARP), an RDMA over converged Ethernet (RoCE) protocol, a direct data placement (DDP) protocol, marker protocol data unit aligned framing (MPA) protocol, transmission control protocol (TCP), user datagram protocol (UDP), Internet Protocol (IP), InfiniBand (IB) protocol, Omni-path protocol, or other suitable protocol. In some embodiments, the processor 117 utilizes multiple protocols for a same packet, for example, the RDMA, DDP, MPA, TCP, and IP protocols. In an embodiment, the processor 117 includes a TCP offload engine (not shown).

The processor 117 is configured to access (e.g., read data from, write data to, process data within) the memory 112, generate packets for transmission to other processor nodes (e.g., processor node 120), and receive packets from the other processor nodes. In an embodiment, the processor 117 is configured to read data from the memory 112 and generate a packet that includes all or a portion of the data. In embodiment, the processor 117 is configured to write data to the memory 112, for example, all or a portion of a packet that was received at the network interface controller 116, or all or a portion of a packet that is stored in the buffer 118. In some embodiments, the processor 117 is configured to access data in the buffer 118, for example, data that is to be transmitted to other processor nodes (e.g., data read from the memory 112), received data from other processor nodes (e.g., to be written to the memory 112), and information about the received data. In an embodiment, the processor 117 is configured to read data from the buffer 118 and generate a packet that includes all or a portion of the data. In embodiment, the processor 117 is configured to write data to the memory 118, for example, all or a portion of a packet that was received at the network interface controller 116.

In some embodiments, the network interface controller 116 includes multiple buffers 118 (e.g., buffers 118-1 and 118-2) and the different instances are utilized for specific types of data, for example, a transmit buffer, a received data buffer, and a packet information buffer, as described below and shown in FIG. 3A. In some embodiments, the processor 117 utilizes the memory 112 as one or more of a transmit buffer, a received data buffer, and a packet information buffer. In other words, the processor 117 utilizes the memory 112 instead of, or in addition to, the buffer 118. In an embodiment, the processor 117 partitions and allocates the memory 112 for the different types of data.

In various embodiments, portions of the memory 112 and buffers 118 are utilized as an application buffer, an out of order (OOO) buffer, and an out of order packet (OOP) information buffer. In the embodiment shown in FIG. 1, the memory 112 is the application buffer, the buffer 118-1 is the OOO buffer, and the buffer 118-2 is the OOP information buffer. In some embodiments, the buffer selector 117a of the processor 117 is configured to select one of the application buffer or the OOO buffer based on an availability of the OOP information buffer to store OOP information for a received packet. In some embodiments, the buffer selector 117a is configured to select one of the application buffer or the OOO buffer based on content or complexity of a received packet, for example, an RDMA operation type associated with the received packet.

The processor node 120 includes a processor 121, a memory 122 coupled with the processor 121 via memory bus 123, and a network interface controller 126 coupled with the processor 121 via communication bus 124 and DMA bus 125, respectively. The network interface controller 126 includes a processor 127 and buffers 128-1 and 128-2. In various embodiments, the processor node 120, processor 121, memory 122, memory bus 123, communication bus 124, DMA bus 125, network interface controller 126, processor 127, and buffers 128 generally correspond to the processor node 100, processor 111, memory 112, memory bus 113, communication bus 114, DMA bus 115, network interface controller 116, processor 117, and buffer 118, respectively.

In various embodiments, the communication link 130 is an Ethernet link, fiber channel link, Omni-Path link, Infini-Band link, or other suitable communication link. Although only a single communication link 130 is shown in FIG. 1, in other embodiments, the communication link 130 is a fabric link that includes multiple links, switches, and routers that connect a set of processor nodes. In an embodiment, the communication link 130 is a part of the Internet. Moreover, in some embodiments, the network interface controller 116 includes multiple independent communication links 130 to the processor node 120 or other processor nodes, for example, via multiple ports (not shown).

Figure 2A:
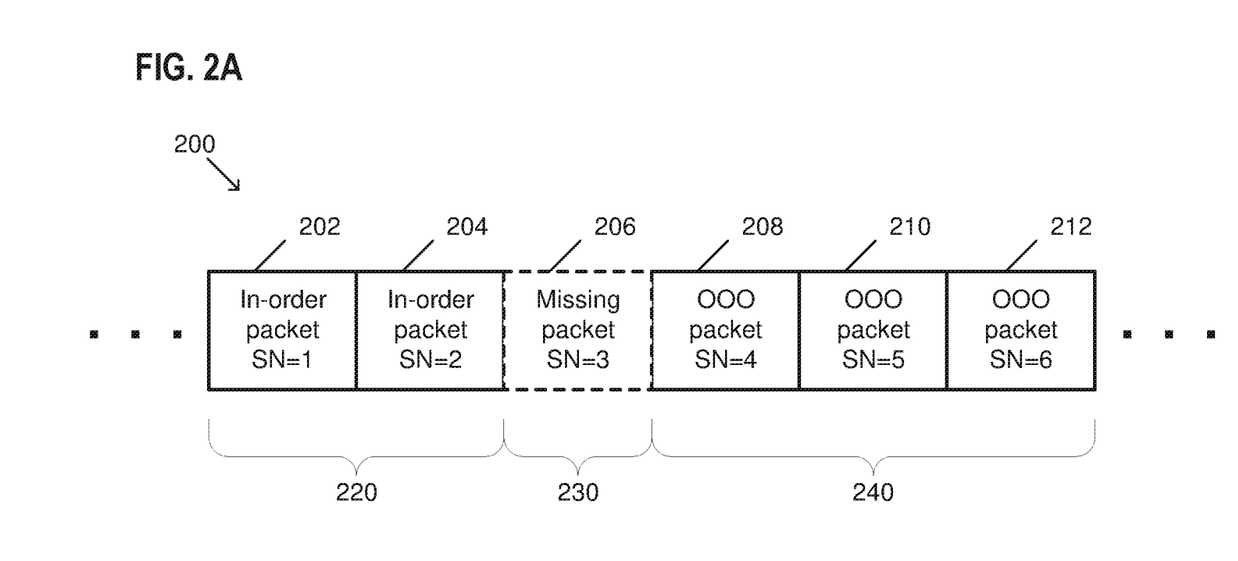
FIG. 2A is a block diagram of a stream of packets that are transmitted from a first network interface controller to a second network interface controller, according to an embodiment.

FIG. 2A is a block diagram of a stream of packets 200 ("packet stream 200") that are transmitted from the network interface controller 116 of the processor node 110 to the network interface controller 126 of the processor node 120, in an embodiment. In an embodiment, the packets of the packet stream 200 are transmitted by the network interface controller 116 in a sequence represented by respective sequence numbers that are assigned to corresponding packets in the packet stream 200. In some scenarios, for example, environments with packet loss or complex network paths across the communication link 130, one or more of the RDMA packets may be lost or delayed, which results in the receipt of out of order (OOO) packets by the receiving processor node. In the embodiment shown in FIG. 2A, the packet stream 200 includes packets 202, 204, 206, 208, 210, and 212. Packets 202 and 204 having sequence numbers "1" and "2," respectively, are received in the order of their respective sequence numbers ("in-order packet"). Packet 206 is a "missing" packet with sequence number "3," having been delayed or dropped during transmission over the communication link 130, or otherwise rendered unusable (e.g., due to data corruption). Packets 208, 210, and 212 are "out of order" packets having sequence numbers "4," "5," and "6," respectively, and arrive before the missing packet 206. In various embodiments, the missing packet 206 arrives after the OOO packets, or is re-transmitted by the network interface controller 116 (e.g., after waiting a period of time without receiving a confirmation of receipt at the network interface controller 126).

Figure 2B:
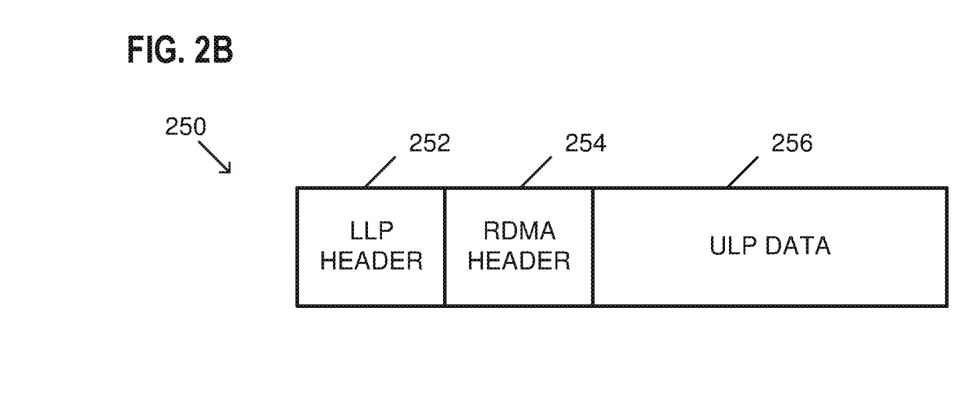
FIG. 2B is a block diagram of an example RDMA packet 250, according to an embodiment.

FIG. 2B is a block diagram of an example RDMA packet 250, according to an embodiment. In various embodiments, the packets of the packet stream 200 include RDMA packets, for example, the RDMA packet 250. The RDMA packet 250 includes a lower layer protocol (LLP) header 252, an RDMA header 254, and upper layer protocol (ULP) data 256. In an embodiment, the ULP data 256 includes data that is to be written to application memory of the processor node 120 (e.g., to memory 122). In other embodiments, the ULP data 256 is data that has been read from the application memory (e.g., memory 112 or 122). The RDMA header 254 includes information for an RDMA operation, for example, an operation type (e.g., Send, Send with Invalidate, Send with Solicited Event, Send with Solicited Event and Invalidate, Remote Direct Memory Access Write, Remote Direct Memory Access Read, and Terminate), one or more buffer identifiers (e.g., a steering tag, location or tagged offset, and length). In some embodiments, the RDMA header 254 includes a DDP header and/or MPA header. The LLP header 252 includes one or more lower level protocol headers, for example, a TCP/IP header, stream control transmission protocol (SCTP)/IP header, iWARP header, RoCE header, user datagram (UDP)/IP, Infini-B and header, Omni-path header, or other suitable header. In an embodiment, the LLP header 252 includes the sequence number of the packet 250, for example, a sequence number of a TCP header. In another embodiment, the sequence number is included as a message ID of an SCTP packet.

In the embodiment shown in FIG. 2A, the packet stream 200 includes in-order packets 220 and out-of-order packets 240 that are consistent with the transmitted sequence except for the missing packet(s) 230. In some scenarios, the in-order packets 220 are referred to as a "peninsula" while the OOO packets 240 are referred to as an "isle." Although only a single "isle" is shown in FIG. 2A, in some scenarios, multiple isles are formed by missing packets. In an embodiment, for example, when a packet stream includes packets having sequence numbers 1 through 10, when packets having sequence numbers 3, 6, and 8 are missing, the peninsula includes packets having sequence numbers 1 and 2, a first isle includes packets having sequence numbers 4 and 5, a second isle includes the packet having sequence number 7, and a third isle includes packets having sequence numbers 9 and 10.

FIGS. 3A, 3B, 4A, 4B, 5A, and 5B are block diagrams of example buffers 310, 320, and 330 showing their contents during a reception 300 of a stream of packets received at a processor node, according to an embodiment. In an embodiment, the reception 300 corresponds to a sequential receipt of the packet stream 200 at the processor node 120, in other words, a sequential receipt of packets having sequence numbers 1, 2, 4, 5, 6, and 3. In some embodiments, the buffer 310 is an application buffer configured to store application data, operating system data, or other suitable data. In an embodiment, the buffer 310 generally corresponds to the memory 122 and is referred to herein as application buffer 310. The network interface controller 126 is configured to receive an RDMA packet and store the RDMA packet (or at least a portion thereof) in the application buffer 310 according to the RDMA protocol, in an embodiment.

In some embodiments, the buffer 320 is an out-of-order packet (OOP) information buffer configured to store OOP information, as described below. In an embodiment, the buffer 320 generally corresponds to the buffer 128 and is referred to herein as OOP information buffer 320. In some embodiments, the OOP information buffer 320 is implemented in both the memory 122 and the buffer 128. In some embodiments, the OOP information buffer 320 is implemented in only the memory 122. In some embodiments, the buffer 330 is an out-of-order (OOO) buffer configured to store OOO packets, for example, until the OOO packets can be placed in the application buffer 310. In an embodiment, the buffer 330 generally corresponds to the buffer 128 and is referred to herein as OOO buffer 330. In some embodiments, the OOO buffer 330 is implemented in both the memory 122 and the buffer 128. In some embodiments, the OOO buffer 330 is implemented in only the memory 122. In an embodiment, the network interface controller 126 stores an entire OOO packet in the OOO buffer 330 as a single packet (e.g., as the RDMA packet 250 having an LLP header 252, RDMA header 254, and ULP data 256). In another embodiment, the network interface controller 126 stores the entire OOO packet in the OOO buffer 330 as two or more separate portions (e.g., as a first portion having the LLP header 252 and RDMA header 254, and a second portion having the ULP data 256). In another embodiment, the network interface controller 126 extracts and stores the RDMA header 254 and ULP data 256 in the OOO buffer 330 (e.g., as a single data unit or as separate portions) and discards the LLP header 252.

In some embodiments, the OOP information buffer 320 and the OOO buffer 330 are implemented in different memory buffers of the processor node 120 (e.g., as respective buffers 128-1 and 128-2, as an OOO buffer in the memory 122 and OOP information buffer in the buffer 128, or as an OOO buffer in the buffer 128 and OOP information buffer in the memory 122). In other embodiments, the OOP information buffer 320 and the OOO buffer 330 share one or more memory buffers of the processor node 120 (i.e., corresponding to different memory addresses within a same buffer). In some embodiments, the OOP information buffer 320 is partitioned and allocated for respective packet streams or connections (e.g., multiple concurrent connections with a single processor node 110, or multiple concurrent connections with multiple, different processor nodes 110). In the embodiment described for the reception 300, the OOP information buffer is partitioned into a first portion 320-1 allocated for the packet stream 200, a second portion 320-2 allocated for a different packet stream (not shown), and a third portion 320-3 allocated for yet another packet stream (not shown). In an embodiment, the network interface controller 126 is configured to dynamically partition the OOP information buffer 320, for example, based on packet stream priority, processor node priority, packet loss ratio, latency, or other suitable characteristics. In some embodiments, the OOO buffer 330 is implemented as a "global" OOO buffer and is configured to store OOO packets and OOP information from multiple packet streams or connections.

Figure 3A:
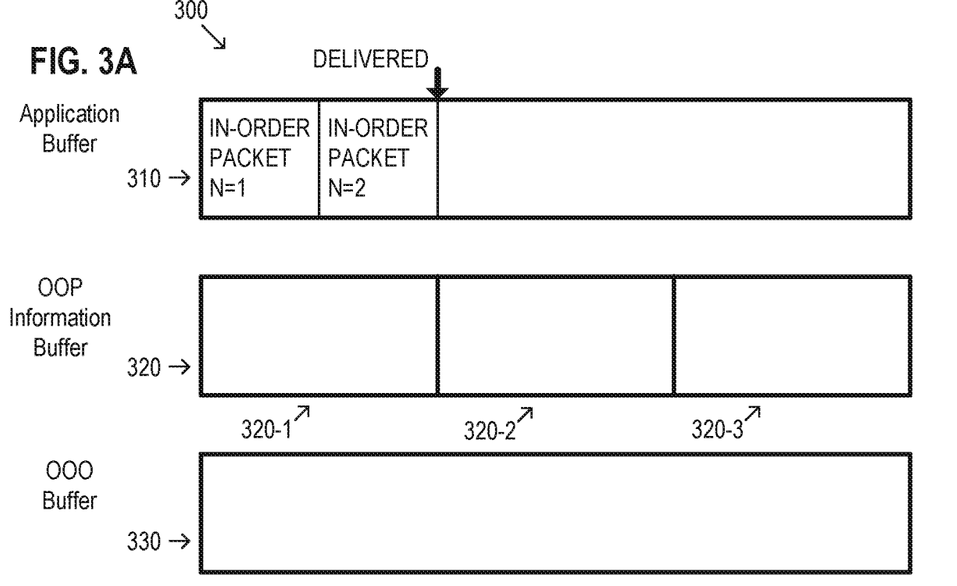
FIGS. 3A, 3B, 4A, 4B, 5A, and 5B are block diagrams of example buffers showing a stream of packets received at a processor node, according to an embodiment.

At a first time shown in FIG. 3A, in-order packets 202 and 204 have been received in order of their respective sequence numbers, placed into the application buffer 310, and indicated as "delivered," in an embodiment. Delivery refers to a process of informing an upper layer protocol (e.g., an application, operating system, or other consumer of the data from the received packet) that a particular message is available for use, in an embodiment. In some embodiments, the network interface controller 126 removes a portion of a received packet before storing the packet in the application buffer 310. In an embodiment, for example, the network interface controller 126 removes the LLP header 252 and stores a remainder (e.g., the RDMA header 254 and ULP data 256) in the application buffer 310. In another embodiment, for example, the network interface controller 126 removes the LLP header 252 and the RDMA header 254 and stores the remainder (e.g., the ULP data 256) in the application buffer 310.

Figure 3B:
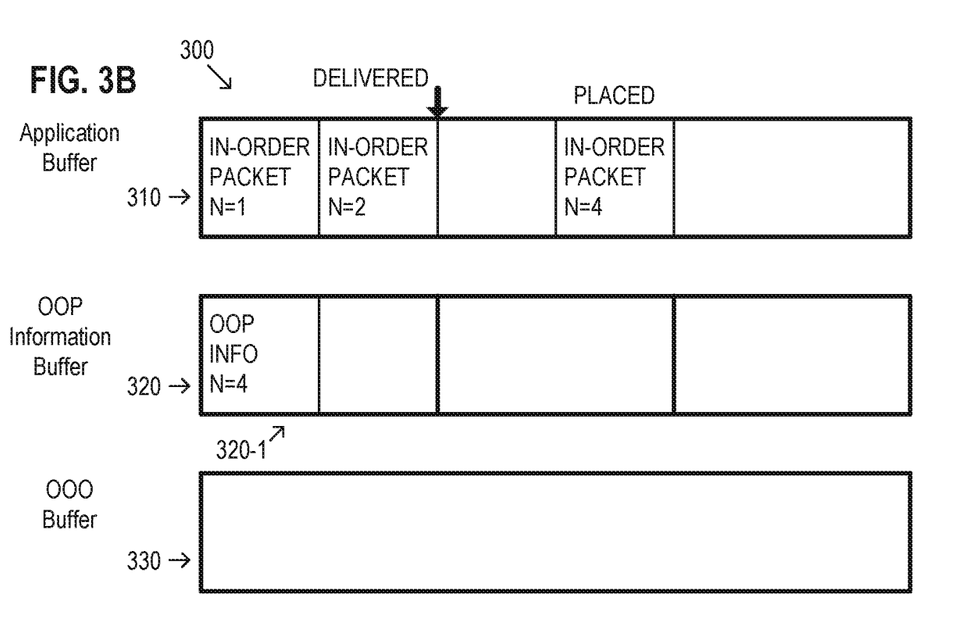

At a second time shown in FIG. 3B, the OOO packet 208 has been received prior to receipt of the missing packet 206, in an embodiment. In other words, the OOO packet 208 is received out of order relative to the missing packet 206 (i.e., the OOO packet 208 has a sequence number that is larger than a sequence number of the missing packet 206 and is received before the missing packet 206). The network interface controller 126 selects one of the OOO buffer 330 or the application buffer 310 and stores the OOO packet 208 in the selected buffer. As described above, in some embodiments, the network interface controller 126 stores the entire OOO packet 208 in the selected buffer. In some embodiments, the network interface controller 126 stores a remainder of the OOO packet 208 in the selected buffer (e.g., discarding the LLP header 252 and/or RDMA header 254).

In various embodiments and/or scenarios, the network interface controller 126 selects the application buffer 310 when the OOP information buffer 320 that is associated with the packet stream is available to store first OOP information that corresponds to the first OOO packet 208. In the embodiment shown in FIG. 3B, the OOP information buffer 320-1 that is associated with the packet stream 200 has available capacity to store OOP information, for example, two available "slots" to store OOP information for different packets. Although only two slots are shown in the figures, the OOP information buffer 320-1 may have three, four, or more slots available for OOP information in other embodiments. In the embodiment shown in FIG. 3B, the network interface controller 126 stores or "places" the OOO packet 208 in the application buffer 310 and stores corresponding OOP information in the OOP information buffer 320. The network interface controller 126 places the OOO packet 208 in the application buffer 310 at a location in the application buffer 310 that is offset from an end of a most recently received in-order packet of the packet stream 200 (shown as "DELIVERED"), where an offset amount corresponds to the missing packet 206. In an embodiment, the offset amount corresponds to a length of the missing packet 206 (or, in some scenarios, a combined length of multiple missing packets). The OOP information includes information used by the processor 127 to "deliver" an OOP packet that has been placed in the application buffer 310. In an embodiment, the processor 127 extracts the OOP information from the OOO packet 208, for example, from the RDMA header 254 and/or ULP data 256. In some embodiments, the OOP information includes a memory location identifier that identifies a location within the memory 122 at which to store the OOP packet 208. In an embodiment, the OOP information includes information from the RDMA header 254 (e.g., a steering tag, location or tagged offset, and length).

In other embodiments, the network interface controller 126 selects the OOO buffer 330 when the OOP information buffer 320 is not available to store the OOP information for the OOO packet 208. In an embodiment, the OOP information buffer 320 is not available to store the OOP information when the OOP information buffer 320 is full (e.g., each slot is already utilized for other OOO packets). In some embodiments, the OOP information buffer 320 is not available to store the OOP information when the OOO packet includes an RDMA operation, or a portion of an RDMA operation, that meets a complexity threshold. In an embodiment, the complexity threshold is met when the RDMA operation type is a particular operation type that is i) not supported by the network interface controller 126, or ii) does not allow for out of order placement, for example, an atomic operation such as "fetch and add" or "compare and swap." In another embodiment, the complexity threshold is met when the RDMA operation relies upon a result of a prior RDMA packet. In another embodiment, the complexity threshold is met when the OOO packet is a member of an isle that is not supported by the network interface controller 126. In an embodiment, for example, the network interface controller 126 supports placement into the application buffer 310 only when the OOO packet is a member of a first or second isle, but not a third isle, fourth isle, or higher order isle.

Figure 4A:
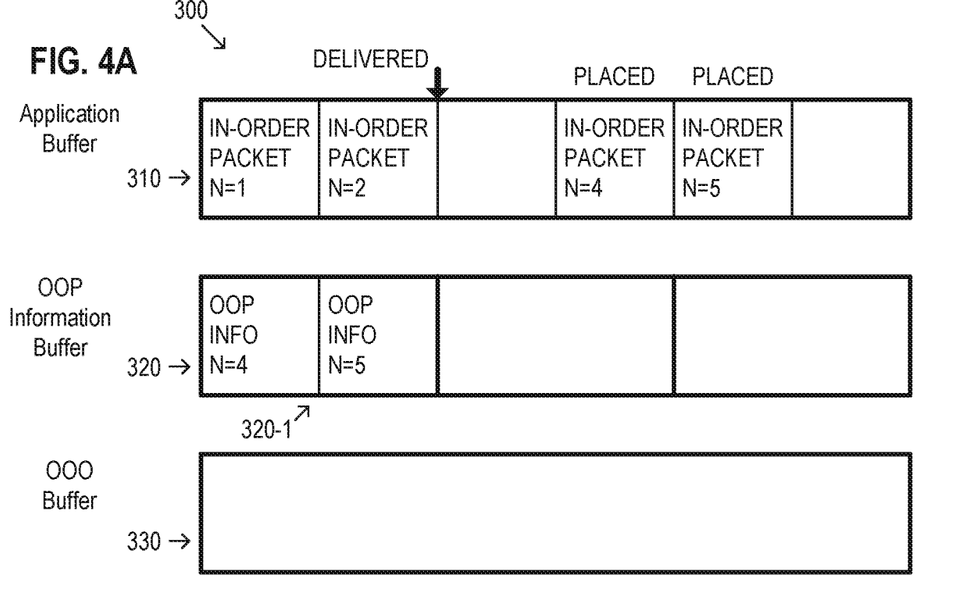

At a third time shown in FIG. 4A, the OOO packet 210 has been received prior to receipt of the missing packet 206, in an embodiment. In other words, the OOO packet 210 is received out of order relative to the missing packet 206. The network interface controller 126 selects one of the OOO buffer 330 or the application buffer 310 and stores the OOO packet 210 in the selected buffer, in a manner similar to that used for the OOO packet 208. In the embodiment shown in FIG. 4A, the OOP information buffer 320-1 has available capacity to store OOP information (e.g., one slot remains) and the network interface controller 126 places the OOO packet 210 in the application buffer 310 and stores corresponding OOP information in the OOP information buffer 320-1.

Figure 4B:
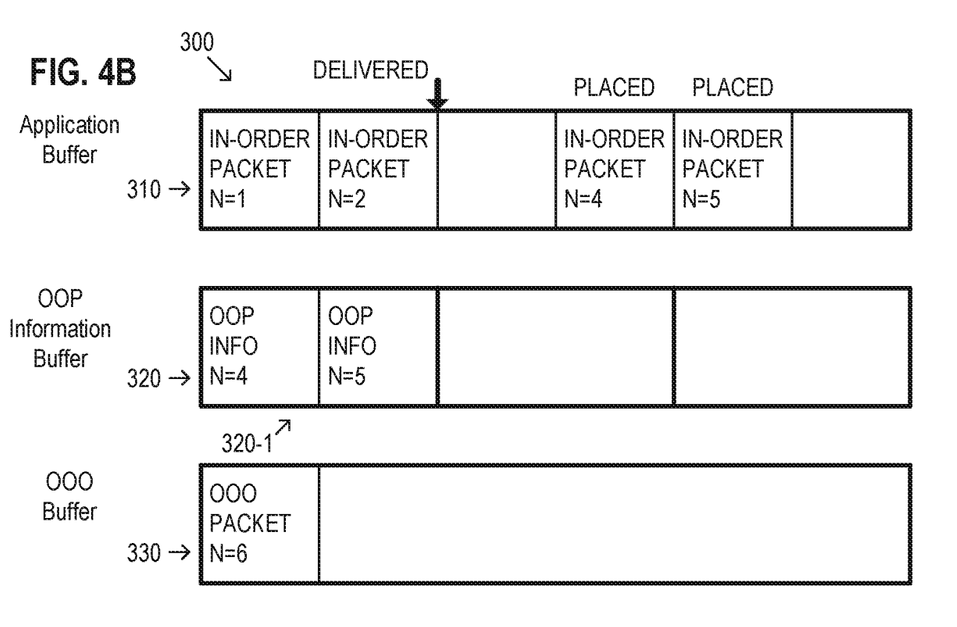

At a fourth time shown in FIG. 4B, the OOO packet 212 has been received prior to receipt of the missing packet 206, in an embodiment. The network interface controller 126 selects one of the OOO buffer 330 or the application buffer 310 and stores the OOO packet 210 in the selected buffer, in a manner similar to that used for the OOO packet 208. In the embodiment shown in FIG. 4B, the OOP information buffer 320-1 does not have available capacity to store OOP information (e.g., all slots are full) and the network interface controller 126 stores the OOO packet 212 (or a remainder thereof) in the OOO buffer 330. In some embodiments, the network interface controller 126 stores the OOO packet 212 (or a remainder thereof) and OOP information corresponding to the OOO packet 212 separately within the OOO buffer 330.

In some embodiments and/or scenarios, the network interface controller 126 drops the OOO packet 212 when the OOP information buffer 320-1 does not have available capacity to store the OOO packet 212. In some embodiments and/or scenarios, the network interface controller 126 drops the OOO packet 212 when the OOO buffer 330 does not have available capacity to store the OOO packet 212 and corresponding OOP information.

Figure 5A:
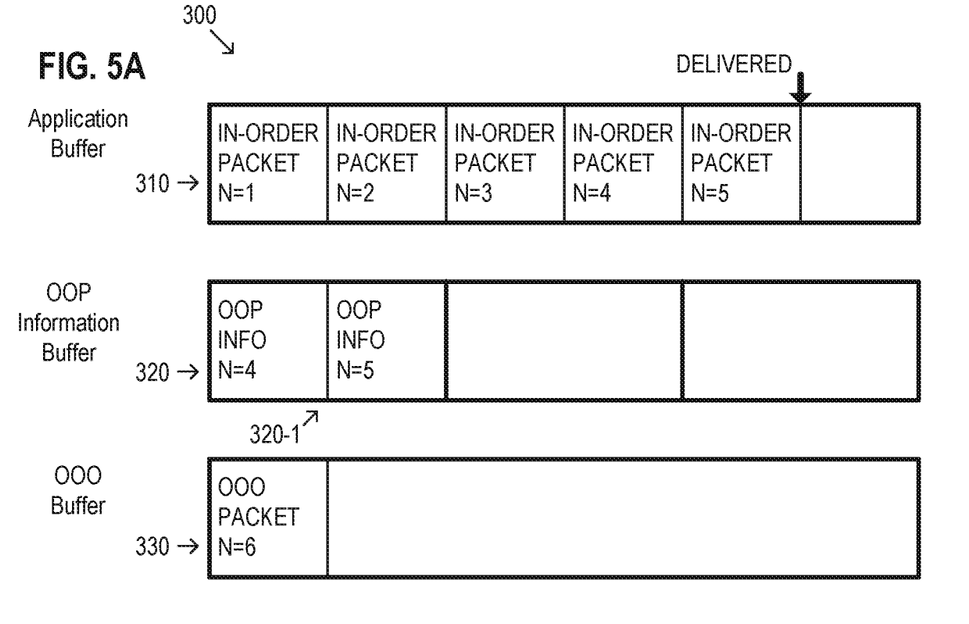
Figure 5B:
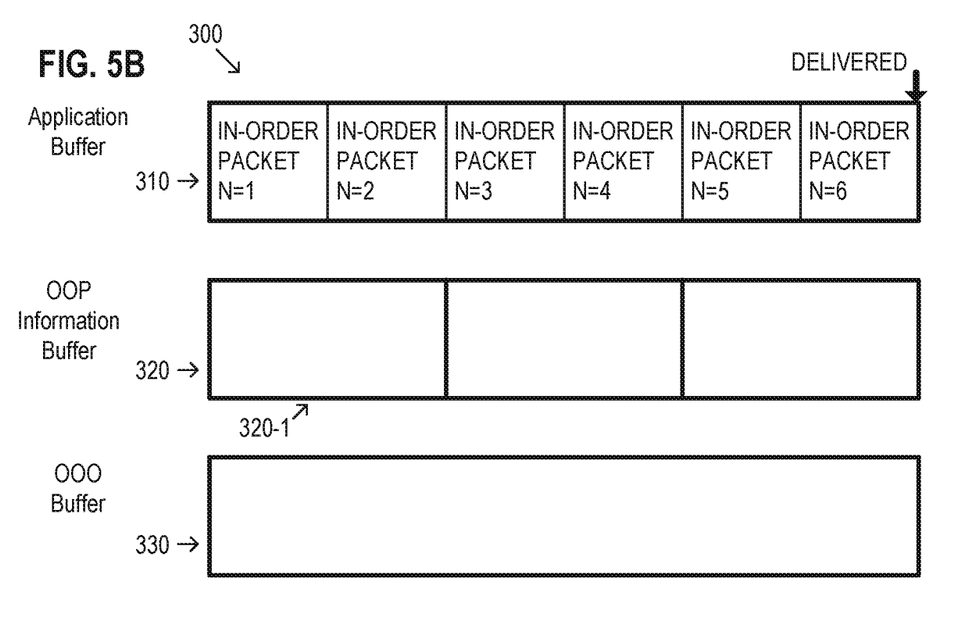

At a fifth time shown in FIG. 5A, the network interface controller 126 has received the missing packet 206, in an embodiment. The network interface controller 126 stores the missing packet 206 in the application buffer 310 at a location that is after a most recently received in-order packet of the packet stream 200 (i.e., after packet 204), in an embodiment. The network interface controller 126 determines whether the offset amount within the application buffer 310 has been filled by the missing packet 206. In other words, the network interface controller 126 determines whether the missing packet 206 connects the first isle (packets 208 and 210) to the peninsula (packet 204). When the missing packet has not filled the offset amount within the application buffer 310, the network interface controller 126 sends a completion indicator (i.e., a delivery indication) that corresponds to the missing packet 206 to the processor node 120, in an embodiment. In other words, when the first isle has not been connected to the peninsula, the network interface controller 126 provides a delivery indication for only the missing packet 206. On the other hand, when the missing packet has filled the offset amount within the application buffer 310, the network interface controller 126 provides a delivery indication for the missing packet 206 and for each packet of the first isle that has been connected to the peninsula (i.e., packets 208 and 210, using the corresponding OOP information stored in the OOP information buffer 320). In an embodiment, the network interface controller 126 clears the OOP information for the packets 208 and 210 after delivery of the packets.

In some embodiments and/or scenarios, when the missing packet 206 has filled the offset amount within the application buffer 310, the network interface controller 126 copies OOO packets of the packet stream that are next in the sequence from the OOO buffer 330 to the application buffer 310. At a sixth time shown in FIG. 5B, the network interface controller 126 copies the packet 212 from the OOO buffer 330 to the application buffer 310 (e.g., using OOP information in the packet 212) and provides a delivery indication to the processor node 120. In some embodiments, the network interface controller 126 combines delivery indications for multiple packets, for example, when receipt of a single packet makes delivery of the multiple packets possible. In the present example, receipt of the missing packet 206 makes delivery of the packets 206, 208, 210, and 212 possible, and, in one embodiment, the network interface controller 126 sends a single delivery indication that identifies each of the packets 206, 208, 210, and 212. In another embodiment, the single delivery indication explicitly identifies only the packet 212, which inherently identifies the preceding packets.

Figure 6:
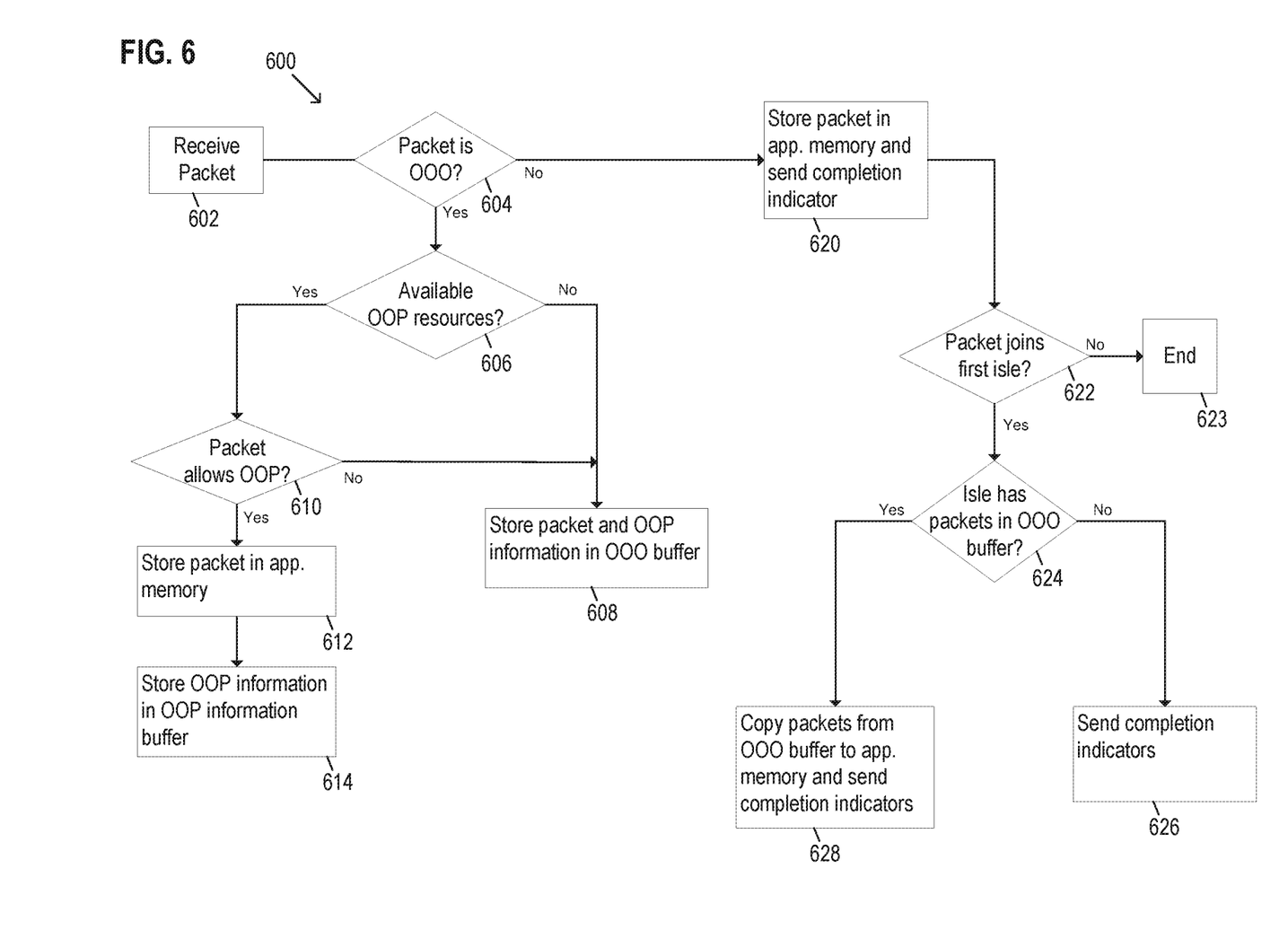
FIG. 6 is a flow diagram of an example method for storing a packet in an application buffer, according to an embodiment.

FIG. 6 is a flow diagram illustrating an example method 600 for storing a packet in an application buffer, according to an embodiment. In an embodiment, the method 600 is implemented by a processor node of the processor node network 100, according to an embodiment. With reference to FIG. 1, the method 600 is implemented by the processor node 120, in an embodiment. For example, in one such embodiment, the network interface controller 126 is configured to implement the method 600. According to another embodiment, the processor 127 is also configured to implement at least a part of the method 600. With continued reference to FIG. 1, in yet another embodiment, the method 600 is implemented by the processor node 110 (e.g., the network interface controller 116 and/or the processor 117). In other embodiments, the method 600 is implemented by other suitable network interfaces.

Although the method 600 is described herein for a single instance of the packet stream 200, the processor node 120 performs separate instances of the method 600 for each connection with a remote processor node (e.g., other instances of the processor node 110), in various embodiments and/or scenarios. In other words, the method 600 is performed separately for each packet stream or connection when multiple concurrent connections with a single processor node are utilized, or when multiple concurrent connections with multiple, different processor nodes are utilized.

At block 602, the network interface controller 126 receives a packet, in an embodiment. The packet is one of an in-order packet (e.g., packet 204 after receiving packet 202, or packet 206 after receiving packet 204) or an OOO packet (e.g., packet 208 when received before packet 206).

At block 604, the network interface controller 126 determines whether the received packet is an OOO packet, in an embodiment. In an embodiment, for example, the network interface controller 126 determines that the received packet is out of order when the received packet has a sequence number that is larger than a sequence number of a missing packet and is received before the first missing packet, or a sequence number that is larger than an expected sequence number (i.e., a sequence number of 6 when a sequence number 4 corresponds to a most recently received in-order packet). When the received packet is not an OOO packet, the method proceeds to block 620. On the other hand, when the received packet is an OOO packet, the method proceeds to block 606.

At block 606, the network interface controller 126 determines whether OOP resources are available for the received OOO packet, in an embodiment. The OOP resources generally correspond to the OOP information buffer 320 and the network interface controller 126 determines whether the OOP information buffer 320-1 that is associated with the packet stream 200 has available capacity to store OOP information, in an embodiment. When the OOP information buffer 320-1 does not have capacity or is otherwise unavailable, the method proceeds to block 608. On the other hand, when the OOP information buffer 320-1 does have capacity, the method proceeds to block 610.

In an embodiment, the network interface controller 126 determines that the OOP information buffer 320 is not available to store the OOP information when the OOP information buffer 320 associated with the packet stream is full, for example, when a size of the packet exceeds a size of available space in the buffer (e.g., when the available space is 256 kilobytes but the packet size is 312 kilobytes). In some embodiments, the network interface controller 126 determines that the OOP information buffer 320 is not available to store the OOP information when the OOO packet includes an RDMA operation that is unsupported for out of order placement, for example, an atomic operation such as "fetch and add" or "compare and swap." In another embodiment, the network interface controller 126 determines that the OOP information buffer 320 is not available when the RDMA operation type relies upon a result of a prior RDMA packet. In another embodiment, the network interface controller 126 determines that OOP information buffer 320 is not available when the OOO packet is a member of an isle that is not supported by the network interface controller 126, for example, when the OOO packet is a member of a third isle, fourth isle, or higher order isle.

At block 608, the network interface controller 126 stores the received packet and the corresponding OOP information in an OOO buffer, in an embodiment. The OOO buffer generally corresponds to the OOO buffer 330, in an embodiment.

At block 610, the network interface controller 126 determines whether the received packet allows for out of order placement, in an embodiment. When the received packet allows for out of order placement, the method proceeds to block 612. On the other hand, when the received packet does not allow for out of order placement, the method proceeds to block 608. The received packet allows for out of order placement when the complexity threshold has not been met, as described above, in an embodiment.

At block 612, the network interface controller 126 stores the received packet in the application buffer, in an embodiment. The application buffer corresponds to the application buffer 310, in an embodiment.

At block 614, the network interface controller 126 stores OOP information corresponding to the received packet in the OOP information buffer, in an embodiment. The OOP information buffer generally corresponds to the OOP information buffer 320, in an embodiment.

At block 620, when the received packet is an in-order packet, the network interface controller 126 stores the in-order packet in the application memory and sends a delivery indication to the processor node 120, in an embodiment.

At block 622, the network interface controller 126 determines whether the received packet joins a first isle to the peninsula, as described above, in an embodiment. When the packet does not join a first isle, the method ends at block 623 (e.g., until another packet is received). When the packet joins a first isle to the peninsula, the method proceeds to block 624.

At block 624, the network interface controller 126 determines whether the first isle, which has been joined to the peninsula by the received packet, has additional packets stored in the OOO buffer, in an embodiment. The network interface controller 126 determines whether the additional packets are present using the OOP information within the OOO buffer, in an embodiment. In an embodiment, for example, the network interface controller 126 determines that a packet is an additional packet for the isle when the packet has a same packet stream identifier, a same source and destination address, or other suitable identifier. When the network interface controller 126 determines that there are no additional packets, the method proceeds to block 626 and the network interface controller 126 sends delivery indicators for the packets in the first isle. On the other hand, when the network interface controller 126 determines that there are additional packets, the method proceeds to block 628.

At block 628, the network interface controller 126 copies the additional packets from the OOO buffer to the application buffer and sends delivery indicators for the packets in the first isle and the packets copied from the OOO buffer.

Figure 7:
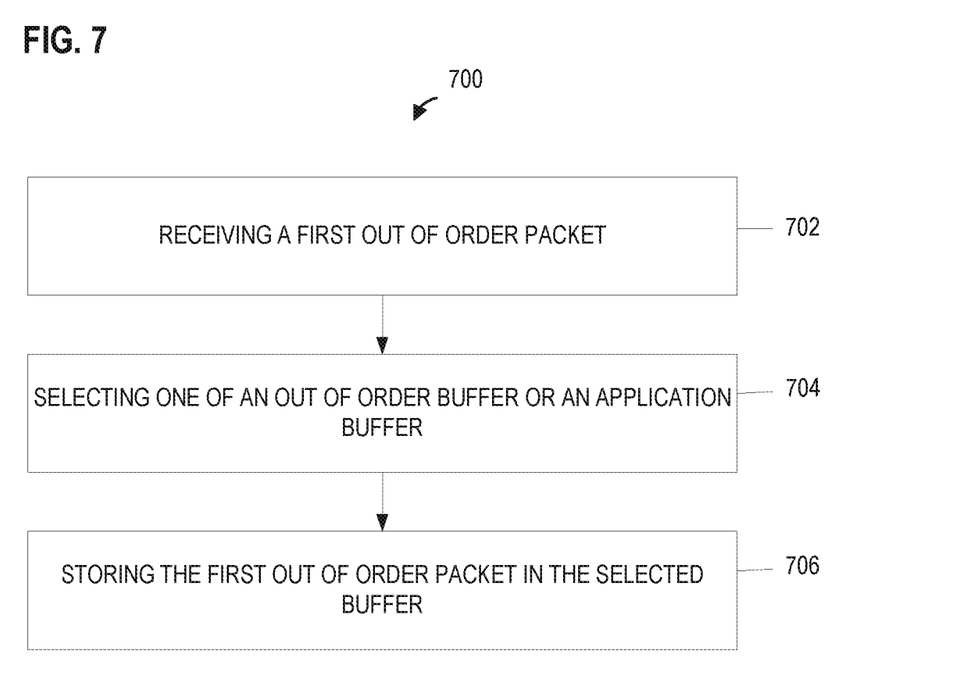
FIG. 7 is a flow diagram of an example method for storing a packet in an application buffer, according to an embodiment.

FIG. 7 is a flow diagram illustrating an example method 700 for storing a packet in an application buffer of a processor node, according to an embodiment. In an embodiment, the method 700 is implemented by a processor node of the processor node network 100, according to an embodiment. With reference to FIG. 1, the method 700 is implemented by the processor node 120, in an embodiment. For example, in one such embodiment, the network interface controller 126 is configured to implement the method 700. According to another embodiment, the processor 127 is also configured to implement at least a part of the method 700. With continued reference to FIG. 1, in yet another embodiment, the method 700 is implemented by the processor node 110 (e.g., the network interface controller 116 and/or the processor 117). In other embodiments, the method 700 is implemented by other suitable network interfaces.

Although the method 700 is described herein for a single instance of the packet stream 200, the processor node 120 performs separate instances of the method 700 for each connection with a remote processor node (e.g., other instances of the processor node 110), in various embodiments and/or scenarios. In other words, the method 700 is performed separately for each packet stream or connection when multiple concurrent connections with a single processor node are utilized, or when multiple concurrent connections with multiple, different processor nodes are utilized.

At block 702, a first out of order (OOO) packet within a stream of packets is received, where the stream of packets is transmitted from a second network device in a sequence represented by respective sequence numbers that are assigned to corresponding packets in the stream, the first OOO packet being received out of order relative to at least a first missing packet of the stream of packets, in an embodiment. The stream of packets generally corresponds to the packet stream 200 and the first OOO packet generally corresponds to one of the packets 208, 210, or 212, in various embodiments and/or scenarios. In an embodiment, the second network device corresponds to the processor node 110 and the first network device corresponds to the first processor node. In an embodiment, the first OOO packet i) has a sequence number that is larger than a sequence number of the first missing packet, and ii) is received before the first missing packet. In an embodiment, the stream of packets includes remote direct memory access (RDMA) packets.

At block 704, one of an OOO buffer of the first network device or an application buffer of the first network device is selected, in an embodiment. The OOO buffer is configured to store OOO packets. The application buffer is configured to store the stream of packets in sequential order. In an embodiment, the application buffer corresponds to the application buffer 310 and the OOO buffer corresponds to the OOO buffer 330. In some embodiments, the application buffer is selected when an OOP information buffer of the first network device that is associated with the stream of packets is available to store first OOP information that corresponds to the first OOO packet, and the OOO buffer is selected when the OOP information buffer is not available to store the first OOP information. In one such embodiment, the OOP information buffer corresponds to the OOP information buffer 320. In an embodiment, the OOP information buffer is designated for a single packet stream of a plurality of packet streams received at the first network device.

At block 706, the first OOO packet is stored in the selected buffer, in an embodiment. In some embodiments, when the application buffer is the selected buffer, the first OOO packet is stored in the application buffer at a location that is offset from an end of a most recently received in-order packet of the stream of packets by an offset amount corresponding to the first missing packet, and the first OOP information is stored in the OOP information buffer. In an embodiment, the first OOO packet is stored in the application buffer using a direct memory access (DMA) bus of a processor node that contains the application buffer. In some embodiments, when the OOO buffer is the selected buffer, the first OOO packet is stored in the OOO buffer. In an embodiment, the OOO packet is dropped when the OOO buffer is the selected buffer and the OOO buffer is full.

In some embodiments, the OOP information buffer is determined to be available to store the first OOP information when i) the OOP information buffer has available space to store the first OOP information, and ii) an RDMA operation type of the first OOO packet allows for out of order placement of the first OOO packet in the application buffer.

In an embodiment, selecting the one of the OOO buffer or the application buffer is based on an remote direct memory access (RDMA) operation type within the first OOO packet.

In some embodiments, the method 600 also includes receiving the first missing packet, storing the first missing packet in the application buffer at a location that is after a most recently received in-order packet of the stream of packets, and determining whether the offset amount within the application buffer has been filled by the first missing packet. In an embodiment, when the first missing packet has not filled the offset amount within the application buffer, a completion indicator that corresponds to the first missing packet is sent to the second network device. In an embodiment, when the first missing packet has filled the offset amount within the application buffer, OOO packets of the stream of packets are copied from the OOO buffer to the application buffer, and a completion indicator is sent to the second network device, where the completion indicator corresponds to i) the first missing packet, ii) the first OOO packet, and iii) the OOO packets copied to the application buffer.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for storing a packet in an application buffer of a processor node, the method comprising:

receiving, at a first network interface controller of the processor node, a first out of order (OOO) packet within a stream of packets transmitted from a second network interface controller in a sequence represented by respective sequence numbers that are assigned to corresponding packets in the stream, the first OOO packet being received out of order relative to at least a first missing packet of the stream of packets;

selecting, at the first network interface controller, one buffer from among multiple buffers for storing the first OOO packet, the multiple buffers including an OOO buffer associated with the first network interface controller and the application buffer associated with the first network interface controller, wherein the OOO buffer is configured to store OOO packets, and wherein the first network interface controller is configured to store the stream of packets in sequential order in the application buffer;
in response to the first network interface controller selecting the application buffer for storing the first OOO packet, storing the first OOO packet in the application buffer; and
in response to the first network interface controller selecting the OOO buffer for storing the first OOO packet:
storing, by the first network interface controller, the first OOO packet in the OOO buffer, and
after receiving the missing packet, copying the first OOO packet from the OOO buffer to the application buffer.

2. The method of claim 1, wherein the first OOO packet i) has a sequence number that is larger than a sequence number of the first missing packet, and ii) is received before the first missing packet.

3. The method of claim 1, wherein selecting the one buffer from among the multiple buffers comprises:
selecting the application buffer in response to determining that first out of order placement (OOP) information corresponding to the first OOO packet can be stored in an OOP information buffer that is configured to store OOP information corresponding to OOO packets stored in the application buffer; and
selecting the OOO buffer in response to determining that first OOP information that corresponds to the first OOO packet cannot be stored in the OOP information buffer.

4. The method of claim 3, further comprising:
when the first network interface controller selects the application buffer for storing the first OOO packet, storing the first OOO packet in the application buffer at a location that is offset from an end of a most recently received in-order packet of the stream of packets by an offset amount corresponding to the first missing packet, and storing the first OOP information in the OOP information buffer.

5. The method of claim 4, the method further comprising:
receiving, at the first network interface controller, the first missing packet;
storing, by the first network interface controller, the first missing packet in the application buffer at a location that is after a most recently received in-order packet of the stream of packets;
determining, at the first network interface controller, whether the offset amount within the application buffer has been filled by the first missing packet;
when the first missing packet has not filled the offset amount within the application buffer, sending a completion indicator that corresponds to the first missing packet to the second network interface controller;
when the first missing packet has filled the offset amount within the application buffer and when one or more OOO packets of the stream of packets are stored in the OOO buffer, copying the one or more OOO packets from the OOO buffer to the application buffer.

6. The method of claim 5, further comprising sending a completion indicator to the second network interface controller that corresponds to i) the first missing packet, ii) the first OOO packet, and iii) when the one or more OOO packets have been copied from the OOO buffer to the application buffer, the OOO packets copied to the application buffer.

7. The method of claim 3, wherein selecting the one buffer from among the multiple buffers comprises selecting the one buffer from among the multiple buffers based on a determination of which remote direct memory access (RDMA) operation, among a plurality of different RDMA operations, is included within the first OOO packet.

8. The method of claim 7, further comprising:
determining, at the first network interface controller, whether the determined RDMA operation within the first OOO packet allows for out of order placement of the first OOO packet in the application buffer; and
selecting the application buffer when it is determined that the OOP information buffer has available space and the determined RDMA operation within the first OOO packet allows for out of order placement.

9. The method of claim 3, further comprising designating the OOP information buffer for a single packet stream of a plurality of packet streams received at the first network interface controller.

10. The method of claim 3, wherein the method further comprises dropping the first OOO packet when i) the first network interface controller selects the OOO buffer for storing the first OOO packet and ii) the OOO buffer is full.

11. The method of claim 1, further comprising:
when the first network interface controller selects the application buffer for storing the first OOO packet, storing the first OOO packet in the application buffer using a direct memory access (DMA) bus of a processor node that contains the application buffer.

12. The method of claim 1, further comprising:
determining, at the first network interface controller, whether an out of order placement (OOP) information buffer has available space to store first OOP information corresponding to the first OOO packet, the OOP information buffer being configured to store OOP information corresponding to OOO packets stored in the application buffer;
wherein selecting the one buffer from among the multiple buffers comprises:
selecting the application buffer to store the first OOO packet in response to determining that the OOP information buffer has available space to store the first OOP information corresponding to the first OOO packet, and
selecting the OOO buffer to store the first OOO packet in response to determining that the OOP information buffer does not have available space to store the first OOP information corresponding to the first OOO packet.

13. The method of claim 12, further comprising:
determining, at the first network interface controller, which remote direct memory access (RDMA) operation, among a plurality of different RDMA operations, is included within the first OOO packet;
wherein selecting the one buffer from among the multiple buffers comprises:
selecting the application buffer to store the first OOO packet in response to determining that i) the OOP information buffer has available space, and ii) the determined RDMA operation is a first type of RDMA operation, and
selecting the OOO buffer to store the first OOO packet in response to determining that the determined RDMA operation is a second type of RDMA operation.

14. A network interface controller for storing a packet in an application buffer of a first processor node, the network interface controller comprising:
a processor configured to:

access the application buffer of the processor node, the application buffer being configured to store a stream of packets in sequential order, access an out of order placement (OOP) information buffer configured to store OOP information corresponding to OOO packets stored in the application buffer, and access an out of order (OOO) buffer configured to store OOO packets, receive a first OOO packet within the stream of packets, the stream of packets being transmitted from a second processor node in a sequence represented by respective sequence numbers that are assigned to corresponding packets in the stream, the first OOO packet being received out of order relative to at least a first missing packet of the stream of packets, select one buffer from among multiple buffers for storing the first OOO packet, the multiple buffers including the OOO buffer and the application buffer, in response to selecting the application buffer for storing the first OOO packet, store the first OOO packet in the application buffer, and in response to selecting the OOO buffer for storing the first OOO packet,
store the first OOO packet in the OOO buffer, and
after receiving the missing packet, copy the first OOO packet from the OOO buffer to the application buffer.

15. The network interface controller of claim 14, wherein the first OOO packet i) has a sequence number that is larger than a sequence number of the first missing packet, and ii) is received before the first missing packet.

16. The network interface controller of claim 14, wherein the processor is further configured to:
select the application buffer in response to determining that first OOP information corresponding to the first OOO packet can be stored in the OOP information buffer; and
select the OOO buffer in response to determining that first OOP information that corresponds to the first OOO packet cannot be stored in the OOP information buffer.

17. The network interface controller of claim 16, wherein the processor is further configured to:
when the processor selects the application buffer, store the first OOO packet in the application buffer at a location that is offset from an end of a most recently received in-order packet of the stream of packets by an offset amount corresponding to the first missing packet, and store the first OOP information in the OOP information buffer.

18. The network interface controller of claim 17, wherein the processor is further configured to:
receive the first missing packet;
store the first missing packet in the application buffer at a location that is after a most recently received in-order packet of the stream of packets;
determine whether the offset amount within the application buffer has been filled by the first missing packet;
when the first missing packet has not filled the offset amount within the application buffer, send a completion indicator that corresponds to the first missing packet to the second processor node;
when the first missing packet has filled the offset amount within the application buffer and when one or more OOO packets of the stream of packets are stored in the OOO buffer,
copy the one or more OOO packets from the OOO buffer to the application buffer.

19. The network interface controller of claim 18, wherein the processor is further configured to send a completion indicator to the second processor node that corresponds to i) the first missing packet, ii) the first OOO packet, and iii) when the one or more OOO packets have been copied from the OOO buffer to the application buffer, the OOO packets copied to the application buffer.

20. The network interface controller of claim 18, wherein the processor is further configured to, when the processor selects the application buffer for storing the first OOO packet, store the first OOO packet in the application buffer using a direct memory access (DMA) bus of the first processor node.

21. The network interface controller of claim 20, wherein the application buffer is configured to store data at the application layer of the Open Systems Interconnection model.

22. The network interface controller of claim 16, wherein the processor is configured to select the one buffer from among the multiple buffers based on a determination of which remote direct memory access (RDMA) operation, among a plurality of different RDMA operations, is included within the first OOO packet.

23. The network interface controller of claim 22, wherein the processor is configured to determine at least one of i) whether the OOP information buffer has available space to store the first OOP information, and ii) whether the determined RDMA operation within the first OOO packet allows for out of order placement of the first OOO packet in the application buffer;
wherein the buffer selector is configured to select the application buffer when it is determined that the OOP information buffer has available space and the determined RDMA operation within the first OOO packet allows for out of order placement.

24. The network interface controller of claim 16, wherein the processor is configured to designate the OOP information buffer for a single packet stream of a plurality of packet streams received at the first network interface controller.

25. The network interface controller of claim 16, wherein the processor is further configured to drop the OOO packet when the OOO buffer is the selected buffer and the OOO buffer is full.

26. The network interface controller of claim 14, wherein the network interface controller comprises the OOP information buffer and the processor node comprises the OOO buffer.

27. The network interface controller of claim 14, wherein the processor node comprises the OOP information buffer and the OOO buffer.

28. The network interface controller of claim 14, wherein the processor is further configured to:
determine whether the OOP information buffer has available space to store first OOP information corresponding to the first OOO packet;
select the application buffer to store the first OOO packet in response to determining that the OOP information buffer has available space to store the first OOP information corresponding to the first OOO packet; and
select the OOO buffer to store the first OOO packet in response to determining that the OOP information buffer does not have available space to store the first OOP information corresponding to the first OOO packet.

29. The network interface controller of claim 28, wherein the processor is further configured to:
- determine which remote direct memory access (RDMA) operation, among a plurality of different RDMA operations, is included within the first OOO packet;
- select the application buffer to store the first OOO packet in response to determining that i) the OOP information buffer has available space, and ii) the determined RDMA operation is a first type of RDMA operation; and
- select the OOO buffer to store the first OOO packet in response to determining that the determined RDMA operation is a second type of RDMA operation.

\* \* \* \* \*